US011714028B2

(12) United States Patent
Carini et al.

(10) Patent No.: US 11,714,028 B2
(45) Date of Patent: Aug. 1, 2023

(54) SYSTEM AND METHOD FOR HEALTH MONITORING OF A BEARING SYSTEM

(71) Applicant: Simmonds Precision Products, Inc., Vergennes, VT (US)

(72) Inventors: Peter J. Carini, Underhill, VT (US); Bernard Dion, Monkton, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/561,662

(22) Filed: Sep. 5, 2019

(65) Prior Publication Data

US 2021/0072116 A1    Mar. 11, 2021

(51) Int. Cl.
*G01M 13/045* (2019.01)
*G05B 23/02* (2006.01)
*G01H 1/10* (2006.01)

(52) U.S. Cl.
CPC .......... *G01M 13/045* (2013.01); *G01H 1/10* (2013.01); *G05B 23/0283* (2013.01)

(58) Field of Classification Search
CPC .... G01M 13/045; G05B 23/0283; G01H 1/10
See application file for complete search history.

(56) References Cited

U.S. PATENT DOCUMENTS

| 5,244,287 A | 9/1993 | Koshikawa | |
|---|---|---|---|
| 5,253,531 A | 10/1993 | Walker et al. | |
| 7,813,906 B2 * | 10/2010 | Shiromaru | G01H 1/003 703/7 |
| 2003/0074159 A1 * | 4/2003 | Bechhoefer | G01N 29/46 702/181 |
| 2008/0234964 A1 * | 9/2008 | Miyasaka | G01M 13/04 702/113 |
| 2013/0116936 A1 * | 5/2013 | Yamamoto | F16C 19/527 702/34 |
| 2013/0184959 A1 * | 7/2013 | Wendelsdorf | B64C 27/04 701/99 |
| 2013/0207810 A1 * | 8/2013 | Kar | G01M 13/021 340/686.3 |
| 2015/0032389 A1 * | 1/2015 | Hedin | G01M 13/00 702/34 |
| 2015/0247778 A1 | 9/2015 | Haschke et al. | |
| 2016/0178464 A1 * | 6/2016 | Burns | F02C 3/10 73/112.01 |
| 2016/0304192 A1 * | 10/2016 | Hale | G01M 13/045 |
| 2017/0352239 A1 | 12/2017 | Bechhoefer | |
| 2019/0195733 A1 | 6/2019 | Stansloski et al. | |
| 2021/0025781 A1 * | 1/2021 | Saarinen | G01M 13/045 |

FOREIGN PATENT DOCUMENTS

CN    102928224 A    2/2013

OTHER PUBLICATIONS

Extended European Search Report dated Jul. 7, 2020, issued during the prosecution of European Patent Application No. EP 19215794.9.

* cited by examiner

*Primary Examiner* — Stephanie E Bloss
(74) *Attorney, Agent, or Firm* — Locke Lord LLP; Scott D. Wofsy; Alicia J. Carroll

(57) ABSTRACT

A method of bearing fault detection including measuring a signal of torsional energy transfer from a rotating device to a non-rotating device at a distance away from the rotating device, calculating a health status of the rotating device based on a comparison of the measured signal to a baseline signal, and calculating a remaining useful life of the rotating device.

13 Claims, 2 Drawing Sheets

SYSTEM AND METHOD FOR HEALTH MONITORING OF A BEARING SYSTEM

BACKGROUND

Technological Field

The present disclosure relates to sensing methods and systems for detecting and prognosing bearing degradation.

Description of Related Art

In rotorcraft, Vibration Monitoring has been the mainstay of Health and Usage Monitoring Systems (HUMS) for decades. HUMS systems monitor the condition of aircraft components and alert the customer to the possibility of impending failures. HUMS systems are designed to minimize scheduled and unscheduled maintenance, maximize available flight hours, and improve the safety of both onboard personnel and the aircraft. HUMS systems enable substantial cost savings for the customer over the life of their vehicles. This methodology has proven to be so successful that components such as bearings have moved to Condition Based Maintenance (CBM) over scheduled maintenance.

HUMS systems that use advanced algorithms to determine the health of gears, shafts and bearings have been used in the aerospace industry for many years. These systems predominantly rely on sensors in close proximity to the desired monitored component for health status determination. One of the most significant factors limiting the effectiveness of these systems is that the further away the sensors are from the monitored components, the more the failure detection capability is reduced for the given component. This particular drawback of the Vibration Monitoring methodology has eliminated its use in certain applications where it would be otherwise desirable to use it for diagnosing the health of a component (i.e. remote bearing, internal gear, etc.).

Under normal operating conditions, bearings allow free rotation between a rotational frame of reference and a non-rotating frame of reference with negligible torsion or torque distributed to the non-rotating frame of reference. However, as degradations of bearings progress, frictional effects in the bearing components can cause the transmission of torque from the rotating frame of reference to the non-rotating frame of reference. As bearings degrade, the friction between reference frames increases, thus generating a torque between the reference frames. This torque can increase above the design margin which can result in a catastrophic failure of the bearing.

Traditionally, bearing faults in rotorcraft have been detected using accelerometers located at fixed locations immediately adjacent to the bearing being monitored. Different fault modes of the bearing generate distinct vibratory profiles which can be detected next to the bearing. The standard method for detecting these vibrations is to locate the sensing axis of the accelerometer in the radial direction as close to the bearing as possible. The methods for local bearing monitoring utilizing the radial vibratory component are well established and enable different fault modes of the bearing to be detected based on those vibration signatures. The vibratory detection can then be subsequently thresholded and used for a determination of a Health Indicator of the bearing which can subsequently be used for Condition Based Maintenance (CBM).

One of the primary limiting factors in the sensitivity of this method, and hence detectability of a bearing fault, is the distance of the sensor from the bearing and the sensors ability to subsequently measure the radial vibratory component. The further away these sensors are from the monitored components, the more the failure detection capability is reduced for the monitored component. Conventional methods and systems have generally been considered satisfactory for their intended purpose. However, there is still a need in the art for a system and method having improved health monitoring and prognosis. The present disclosure may provide a solution for at least one of these remaining challenges.

SUMMARY OF THE INVENTION

A method of bearing fault detection includes measuring a signal of torsional energy transfer from a rotating device to a non-rotating device at a first non-zero distance ($d_1$) away from the rotating device, calculating a health status of the rotating device based on a comparison of the measured signal to a baseline signal, generating a recommendation from this comparison. This can include generation of an exceedance and calculating a remaining useful life of the rotating device based on the health status and removing or replacing the rotating device prior to the rotating device reaches the remaining useful life as further embodiments.

The signal can be a temporal signal and the method can include transforming the temporal signal to a frequency domain, wherein the frequency domain is compared to a harmonic of a structure including the rotating device and the non-rotating device.

Comparison can be based on physical parameters associated with a normal operating condition of a system including the non-rotating device a non-zero distance away from the rotating device versus a profiled faulted condition of the system.

The method can include comparing a torsional measurement value relative to a threshold value and comprising measuring torsional frequencies that align with system vibration modes, wherein the system comprises the rotating device and the non-rotating device.

A health monitoring system is also disclosed including a first object defining a rotational frame, a second object having a length ($\ell$) coupled to the first object defining a non-rotating frame and a primary axis, and a sensor configured for measuring torsional forces (i.e. tangential) and longitudinal forces associated with failure modes since they are coupled harmonically through the stiffness of the shaft attached to the second object a distance ($d_1$) from the first object, wherein the second object is a shaft. A rolling element can be disposed between the first object and the second object. The second object can be fixed at an end opposite the first object at distance ($d_2$).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
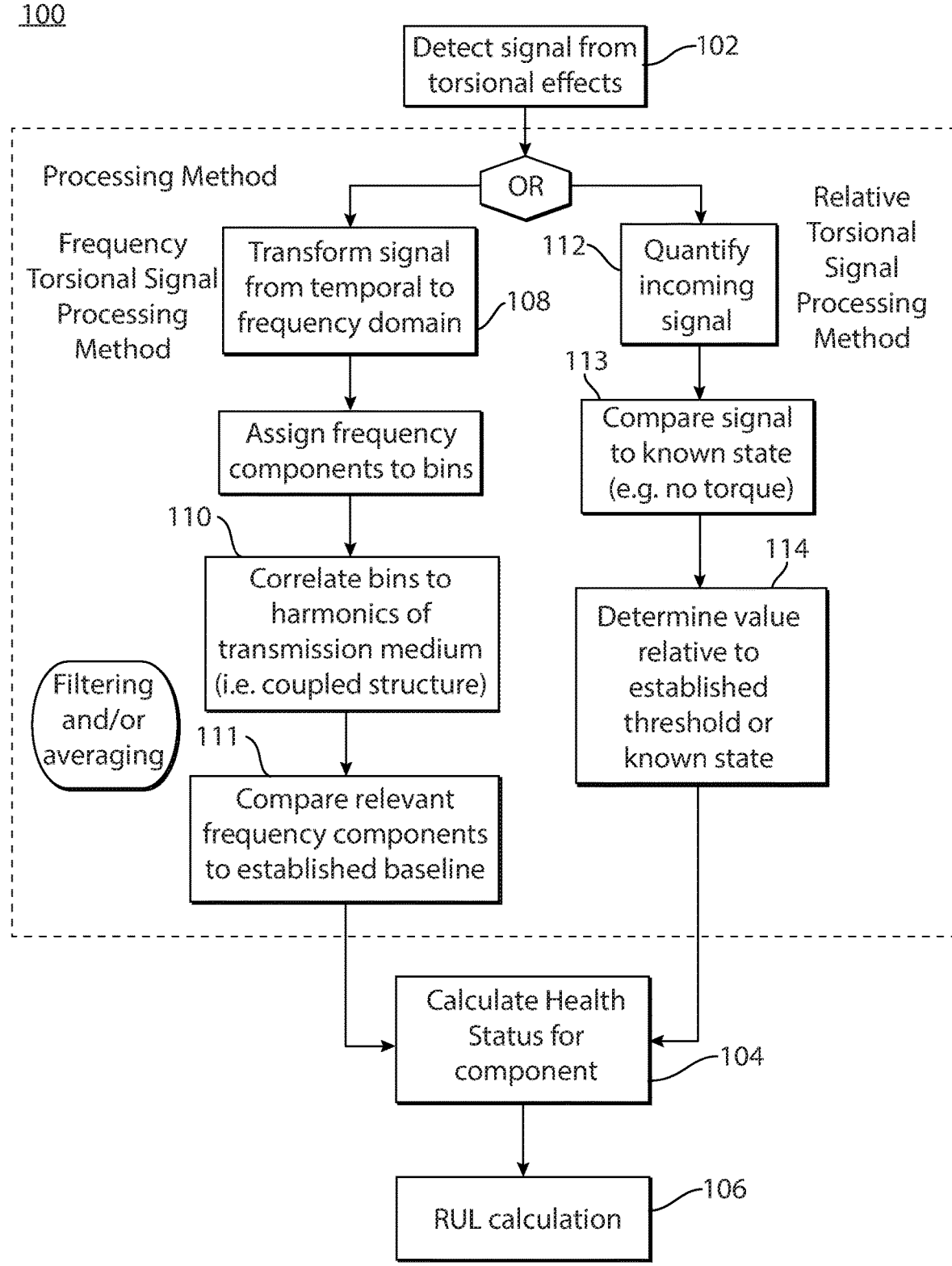
FIG. 1 is a block diagram view of a method of monitoring a health status.
Figure 2:
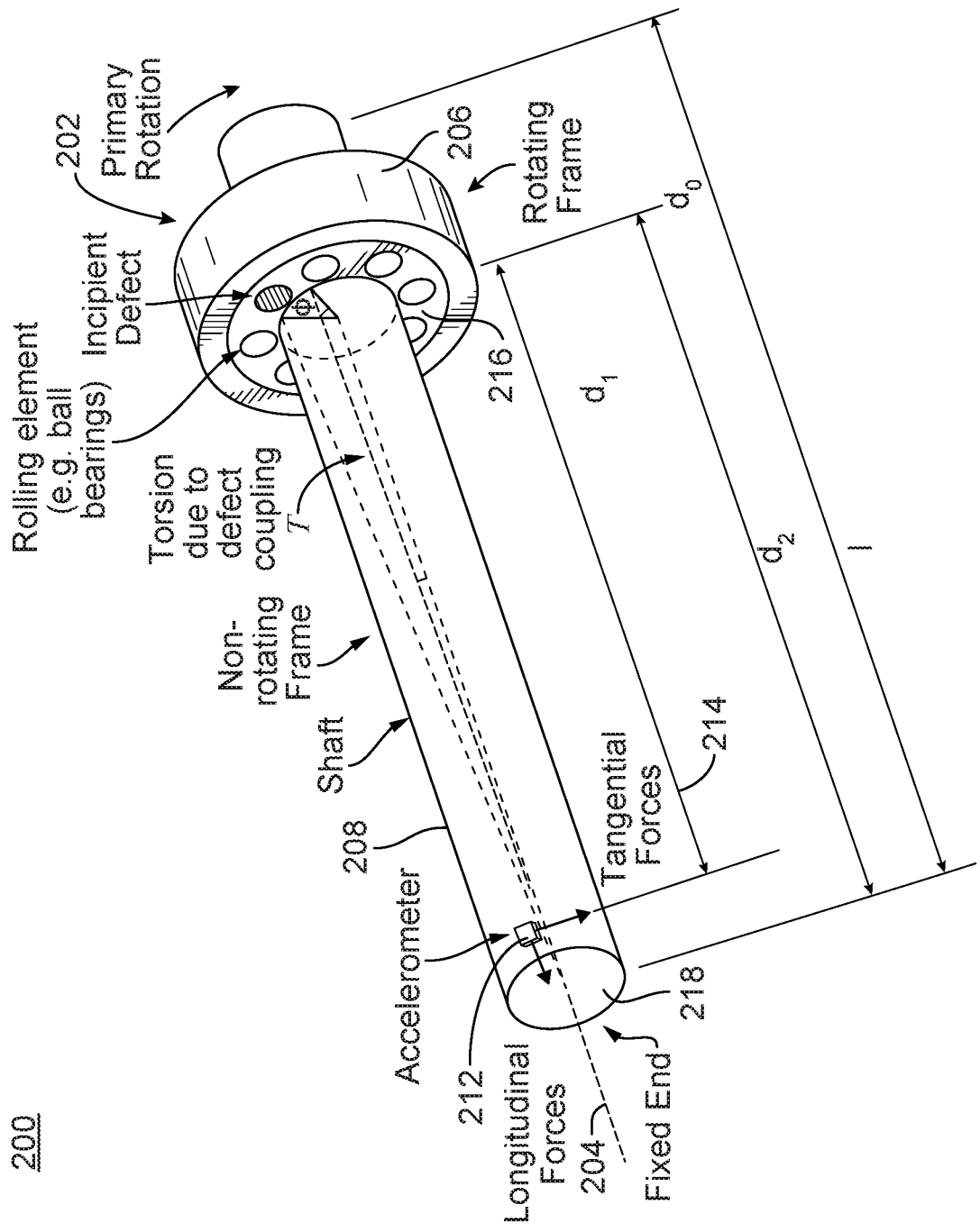
FIG. 2 is a perspective view of a system employing the method of FIG. 1, showing the sensor at a distance ($d_1$) a rotational element.

Reference will now be made to the drawings wherein like reference numerals identify similar structural features or aspects of the subject invention. For purposes of explanation and illustration, and not limitation, a schematic view of an exemplary embodiment of a method in accordance with the invention is shown in FIG. 1 and is designated generally by reference character 100. FIG. 2 shows a system capable of employing the method of FIG. 1. The methods and systems of the invention can be used to provide an alternate method for diagnosing failure modes of rotating components through detection of torsional energy transfer that can be used at a greater distance than traditional methods.

To overcome local dependence of traditional bearing monitoring, a method and system of bearing prognosis at a distance using torsional energy transfer of the bearing to a non-rotating frame of reference is disclosed. In this method, rotational energy from the rotational frame of reference starts to couple with the non-rotating frame of reference as the bearing fault(s) progress and the bearing degrades. As this occurs, the friction between reference frames is increased, thus generating an energy transfer between reference frames. In the case of a shaft, fixed at one end with a rotating component at the other end, this energy transfer between frames of reference may be exhibited by a torsion on the shaft, and hence increased torque in the non-rotating frame (or conversely, reduced torque in the rotating frame). This torsion may be dynamic, manifesting itself in the form of chatter, or quasi-static. Either way, a characteristic vibratory response signature is generated from this torsional transfer generating forces tangential to the shaft. These tangential vibrations are then inherently coupled from the bearing through the length of the shaft (in the fixed shaft example) and can be detected on the opposite (fixed) end. The tangential vibration consists of the combined torsional modes of the shaft (in the fixed shaft example). In this manner, the energy transfer from the rotating frame to the non-rotating frame can be perpetuated through the stiffness of the shaft in the tangential and/or longitudinal directions and be detected at a considerable distance from the bearing, whereas the radial devices traditionally monitored would suffer irrevocable attenuation. As the bearing degrades, races may shift, thus also imparting longitudinal impulses or chatter into the shaft. The subsequent coupled energy can then be detected using accelerometers with sensing axis in the tangential direction (or even in the longitudinal direction in some instances).

FIG. 1 shows a method 100 of bearing fault detection including measuring a signal of torsional energy transfer 102 from a rotating device to a non-rotating device at a distance ($d_1$) away from the rotating device, calculating a health status 104 of the rotating device based on a comparison of the measured signal to a baseline signal and calculating a remaining useful life (RUL) of the rotating device 106. Such method may be used for exceedance generation which can be used for sounding an alarm or alert to the user of the critical health status and then removing or replacing the rotating device before the rotating device reaches the remaining useful life. An exceedance of a thresholded value, where the threshold can be a value used to compare the raw signal strength or to the Health status value. The exceedance may or may not be annunciated. Alarm or alerts could subsequently be annunciated, whereas the exceedance may simply be logged or used in the determination of action.

The detected signal can a temporal signal, which can be transformed to a frequency domain 108, wherein the frequency domain is compared to a harmonic of a structure including the rotating device and the non-rotating device 110 and then relevant frequency components are compared to an established baseline 111, in other words selecting parts of the frequency domain where signals are amplified because they couple with the vibration modes of the structure. It is also conceived that the comparison can be based on physical parameters associated with a normal operating condition of a system including the non-rotating device at a distance away from the rotating device versus a profiled faulted condition of the system using a quantified incoming signal 112. Both aspects of torsional energy transfer detection, signal processing such as FFTs can be employed to facilitate failure mode detection and prediction through correlation of thresholding to a known state or baseline (e.g. either through identification of frequencies of interest or relative root mean square values of force coupling). Thus features and characteristics are extracted from the detected signal that are used to determine Health Status. It is also conceived that the method can include comparing a torsional measurement (e.g. running average of root mean square tangential acceleration) to that of a known state (e.g. nominal) or zero condition 113 and determining the value relative to the threshold which presumes that a threshold has been set for the determination in 114, which may simply be a flag for the exceedance of a threshold or a relative percentage of such. It is further conceived that both techniques can be used is combination to determine the Health Status for a component 104 and calculate a remaining useful life of the rotating device 106, if desired.

FIG. 2 shows a system 200 including a first object 202 which rotates about an axis 204 and defining a rotational frame 206 and a second object 208 having a length ($\ell$), such as a shaft, coupled to the first 202 object, and a sensor 212, such as an accelerometer or torsional strain gages to detect the shear forces associated with torsional strain, configured for measuring tangential and torsional forces attached to the second object 208 a distance ($d_1$) 214 from the first object 202. A rolling element 216, such as a roller bearing or a ball bearing couples the first object 202 and the second object 208. The second object 208 is fixed at an end 218 opposite the first object 202. While FIG. 2 shows an example of a rotating assembly with a fixed shaft, this methodology is also applicable to the analogous scenario of a rotating shaft coupled to a fixed assembly as a corollary embodiment. Note that this torsional energy transfer detection methodology and prognosis can be employed in either scenario.

The methods and systems of the present disclosure, as described above and shown in the drawings, provide for a method of detection and advanced warning of bearing degradation at a distance where existing methodologies cannot be employed, detection of bearing degradation prior to critical failure and additional method of bearing health determination to be used in prognosis for remaining useful life determination or as another means of failure validation. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of bearing fault detection comprising;
measuring a signal of torsional energy transfer from a rotating bearing race having a bearing roller element, to a non-rotating shaft using a sensor coupled to the non-rotating shaft at a first distance ($d_1$) away from the rotating bearing race, wherein the non-rotating shaft defines a longitudinal axis and wherein the first distance is in a direction parallel to the longitudinal axis spaced away from the rotating bearing race;
calculating a health status of the bearing roller element based on a comparison of the measured signal to a baseline signal, wherein the comparison is based on physical parameters associated with a normal operating condition of a system including the shaft at a second distance ($d_2$) away from the rotating bearing race versus a profiled faulted condition of the system, wherein the two distances are spaced axially along the rotational axis; and
generating an exceedance if the torsional energy transfer has exceeded a predetermined threshold value, wherein the health status of the bearing roller element is detected based only on the sensor coupled to the non-rotating shaft at the first distance, wherein the sensor is directly coupled to the non-rotating shaft.

2. The method of claim 1, wherein the first distance ($d_1$) is a non-zero distance.

3. The method of claim 1, further comprising calculating a remaining useful life of the bearing roller element based on the health status.

4. The method of claim 1, further comprising removing or replacing the bearing roller race if the exceedance is generated.

5. The method of claim 1, wherein the signal is a temporal signal.

6. The method of claim 5, further comprising transforming the temporal signal to a frequency domain.

7. The method of claim 6, further comprising comparing the frequency domain to a harmonic of a structure including the rotating bearing race and the non-rotating shaft.

8. The method of claim 1, further comprising comparing the measured torsional energy signal value relative to the predetermined threshold value.

9. The method of claim 8, further comprising measuring torsional frequencies that align with system vibration modes, wherein the system comprises the rotating bearing race and the shaft.

10. The method of claim 1, wherein measuring the signal of torsional energy transfer includes measuring tangential forces on the non-rotating shaft with the sensor.

11. A health monitoring system comprising:
a rotating bearing race defining a rotational frame;
a non-rotating shaft having a length (e) coupled to the rotating bearing race and defining a non-rotating frame and a primary axis;
a bearing roller element disposed between the shaft and the rotating bearing race; and
a sensor attached to the non-rotating shaft a first distance ($d_1$) spaced apart from the bearing roller element and the rotating bearing race, wherein the non-rotating shaft defines a longitudinal axis and wherein the first distance is in a direction parallel to the longitudinal axis spaced away from the rotating bearing race, wherein the two distances are spaced axially along the rotational axis wherein the sensor is configured to measure at least one of torsional, longitudinal, and/or tangential forces, wherein the sensor is configured to monitor the health of the bearing roller element, wherein the health status of the bearing roller element is detected based only on the sensor coupled to the shaft at the first distance, and wherein the sensor is directly coupled to the non-rotating shaft.

12. The system of claim 11, wherein the shaft is fixed at an end opposite the rotating bearing race.

13. The system of claim 11, wherein the sensor is configured to measure tangential forces on the non-rotating shaft.

* * * * *